United States Patent [19]

White, III et al.

[11] Patent Number: 5,363,635
[45] Date of Patent: Nov. 15, 1994

[54] MULCHING MOWER WITH IMPROVED MULCHING BLADE

[75] Inventors: Donald M. White, III, Chanhassen; Gregory P. Tonsager, Plymouth; Richard A. Thorud, Bloomington, all of Minn.

[73] Assignee: The Toro Company, Minneapolis, Minn.

[21] Appl. No.: 31,746

[22] Filed: Mar. 16, 1993

[51] Int. Cl.⁵ ............................................. A01D 34/73
[52] U.S. Cl. ........................................ 56/255; 56/295
[58] Field of Search ........................ 56/17.5, 295, 255

[56] References Cited

U.S. PATENT DOCUMENTS

| | | | |
|---|---|---|---|
| 2,642,711 | 6/1953 | Smith et al. | 56/255 |
| 2,734,327 | 2/1956 | Whitney . | |
| 2,760,327 | 8/1956 | Bovee | 56/255 X |
| 2,806,339 | 9/1957 | Whitney . | |
| 3,049,855 | 8/1962 | McMillan | 56/295 |
| 3,085,386 | 4/1963 | Slemmons | 56/13.4 |
| 3,091,906 | 6/1963 | Hall . | |
| 3,220,170 | 11/1965 | Smith et al. | 56/255 |
| 4,189,903 | 2/1980 | Jackson et al. | 56/255 |
| 4,205,512 | 6/1980 | Thorud | 56/13.4 |
| 4,292,791 | 10/1981 | Lalonde | 56/255 |
| 4,312,174 | 1/1982 | Vanderhoef | 56/320.2 |
| 4,426,831 | 1/1984 | Klas et al. | 56/295 |
| 5,069,025 | 12/1991 | Iversen | 56/295 |
| 5,094,066 | 3/1992 | McBride et al. | 56/17.5 X |
| 5,133,176 | 7/1992 | Baumann et al. | 56/17.4 |

OTHER PUBLICATIONS

Toro Blade Drawings 20-2720, 33-0490, 42-1000, 62-7700, 75-9420 (undated).
Toro Blade Stiffener Drawing No. 80-0510, (undated).
Landscape Management, Sep. 1991, pp. 50 and 98.
Installation Instructions—Eliminator Grass Mulching Kit (undated).

*Primary Examiner*—David J. Bagnell
*Attorney, Agent, or Firm*—James W. Miller

[57] ABSTRACT

A mulching mower has at least one generally enclosed cutting chamber in which a rotatable cutting blade is carried for rotation in a generally horizontal cutting plane. A sidewall defines the circumferential boundary of the cutting chamber and the grass clippings exit the cutting chamber through an open bottom side thereof. An attachment is abutted against the bottom of the blade and is secured thereto by the same attachment bolt that holds the blade to the engine drive shaft to provide a plurality of winglets that rotate in unison with the blade. The winglets include forwardly inclined grass deflecting surfaces that extend over an inner portion of each blade half and help evacuate the grass clippings from the cutting chamber. The tip portions of the blade may also be cut away or chamfered in the range of 7°–15° relative to a square radial tip configuration.

39 Claims, 3 Drawing Sheets

MULCHING MOWER WITH IMPROVED MULCHING BLADE

TECHNICAL FIELD

This invention relates to a mulching lawn mower suited for hiding or depositing the grass clippings cut by the cutting blade(s) of the mower in the cut grass path. More particularly, this invention relates to a cutting blade having an improved tip configuration, and/or to grass deflecting winglets which may be coupled to the blade, which increase the mulching effectiveness of the mower.

BACKGROUND OF THE INVENTION

Mulching mowers are known which direct the grass clippings that have been severed by the cutting blade downwardly out of the cutting chamber to deposit such clippings in the standing grass remaining in the cut grass path. Various kinds of such mulching mowers are known. For example, mulching mowers are disclosed in U.S. Pat. Nos. 4,205,512 and 4,951,449 to Thorud, both of which are assigned to the assignee of this invention.

The mulching mowers shown in the Thorud patents have grass deflecting members or kickers within the cutting chamber to assist in the downward movement of the grass clippings. These kickers comprise angled grass deflecting surfaces that are fixed in each cutting chamber above the plane of the blade. The grass deflecting surfaces are shaped and positioned to intercept the grass clippings as they are being circulated inside the cutting chamber to redirect such clippings downwardly. The kickers are spaced apart around the circumference of the cutting chamber.

Other mulching mowers are known in which no kicker members are present in the cutting chamber. Instead, the cutting chamber and blade are specially shaped to effect mulching. For example, U.S. Pat. No. 3,085,386 to Slemmons discloses a mulching mower having a donut-shaped cutting chamber. A specially configured cutting blade is shaped to cause the grass clippings to be cut in a radial outer portion of the cutting chamber and to be circulated upwardly and inwardly inside the cutting chamber to eventually be driven downwardly out of the cutting chamber through a radial inner portion of the chamber.

The cutting blade shown in the Slemmons patent includes a radial outer tip portion having a cutting edge for severing the grass in the radial outer portion of the cutting chamber. An upwardly directed sail trails the cutting edge of the blade for standing the grass up and for causing a circumferential airflow within the housing which airflow circulates the grass clippings. An intermediate blade section is provided immediately adjacent the radial outer tip of the blade which intermediate section is twisted relative to the outer tip of the blade to be forwardly inclined. This "twisted" blade section allegedly provides a downdraft to help suck the grass clippings downwardly in the radial inner half of the cutting chamber to assist in depositing the clippings into the cut grass path. This "twisted" blade configuration has long been used in this type of donut-shaped housing for mulching. It is often referred to in the lawn mower art as a Bolens type mulcher.

While the mowers described above have been effective for mulching, they require either a specially manufactured housing or blade, as in the Bolens mulchers, or require that a number of kickers be fitted into, or manufactured as part of, the mower housing, as in the Thorud patents. The "twisted" Bolens mulching blade is effectively used only in the particular donut-shaped housing for which it is designed and cannot, therefore, be generally retrofit to mowers having a different housing configuration. Moreover, the "twisted" blade configuration is more difficult, and thus more expensive, to manufacture.

At any given time during their operation, mulching mowers have a large number of grass clippings which are confined inside the cutting chamber and are being circulated in a generally circumferential direction therein. The purpose of the mulching mower is to evacuate these clippings from the chamber by driving them downwardly into the cut grass path and hiding them there.

Applicant has observed that mulching mowers can be stalled when attempting to cut in difficult cutting conditions, such as when cutting particularly tallgrass, and to mulch the resulting clippings. The power requirements to effectively mulch in these conditions are considerable. As a practical matter, one observed characteristic of the use of such mowers in tall grass conditions is that they will stall or stop if the user attempts to travel through the grass too quickly. Accordingly, the user must mulch the grass quite slowly or by cutting the grass in narrow swaths which are narrower than the normal cutting width of the mower. This increases the amount of time required to cut the grass and is, consequently, a disadvantage.

SUMMARY OF THE INVENTION

It is one aspect of this invention to provide a mulching mower having improved power and performance characteristics such that the mower will properly hide grass clippings and will not be as prone to stalling even when cutting in tall grass conditions.

It is another aspect of this invention to provide an attachment that can be easily fitted to the blade of a lawn mower to enhance its mulching effectiveness in an efficient and cost-effective manner, and to an improved blade configuration that can also be used, if desired, with this attachment.

These and other aspects of this invention are embodied in an improved lawn mower for cutting ground growing vegetation. The lawn mower has at least one cutting blade attached to a rotatable drive means for rotating the blade in a generally horizontal cutting plane about a generally vertical rotational axis. The cutting blade includes spaced apart tip portions located on either side of a central portion of the blade, wherein each tip portion includes a leading edge and a trailing edge taken with reference to a forward direction of rotation of the blade. The leading edge of the blade has a sharpened cutting surface for cutting the vegetation and thereby creating vegetation clippings as the blade rotates in the forward direction of rotation. Securing means is provided which engages against a bottom side of the blade to secure the blade to the drive means. The improvement relates to means for enhancing the mulching effectiveness of the blade which comprises an attachment for providing a plurality of winglets on the blade with the winglets acting as rotating kickers for deflecting the vegetation clippings downwardly. The attachment comprises support means on which the winglets are carried. The support means is located below the blade between the blade and the blade securing means such that the support means is held in place against the bottom side of the blade when the blade securing means is in place. A plurality of winglets are carried on the support means. Each winglet has a base portion which is attached to the support means with the winglet extending upwardly from the base portion thereof to terminate in a free upper tip spaced above the cutting plane of the blade.

Another aspect of the present invention comprises an improved tip portion of the blade which also contributes to more efficient mulching, i.e. to power conservation while mulching. This includes tip portions of the blade which terminate adjacent the peripheral sidewall. The tip portions are cut back between the leading and trailing edges thereof by a chamfer in the range of about 7°–15° relative to a square radial tip configuration.

BRIEF DESCRIPTION OF THE DRAWINGS

This invention will be described hereafter in the detailed description, taken in conjunction with the following drawings, in which like reference numerals refer to like elements or parts throughout.

DETAILED DESCRIPTION

Figure 1:
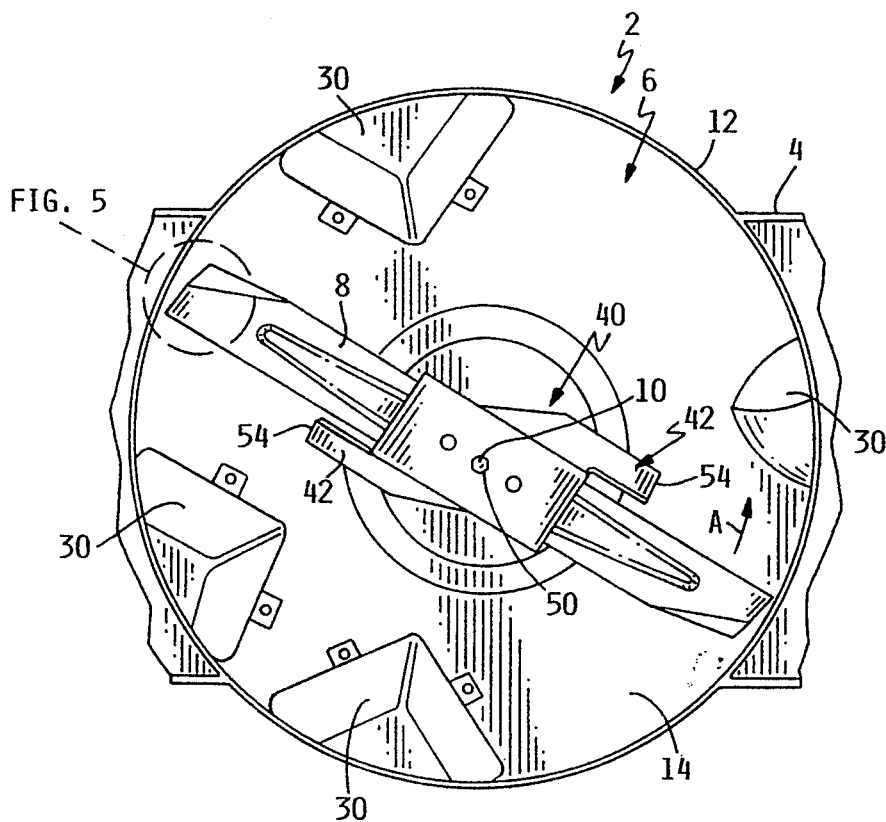
FIG. 1 is a bottom plan view of an improved mulching mower according to this invention, particularly illustrating a first embodiment of a blade winglet attachment according to this invention as applied to a grass cutting blade.

An improved mulching mower according to this invention is generally illustrated in FIG. 1 as 2. Mower 2 includes a housing or cutting deck 4 that is supported for movement over the ground in any suitable manner known in the art, e.g. by a plurality of ground engaging wheels (not shown) or the like. At least one cutting chamber 6 is provided in deck 4 for containing and enclosing a rotatable cutting blade 8. Blade 8 is generally horizontally oriented in cutting chamber 6 to rotate in a generally horizontal cutting plane about a generally vertical rotational axis 10.

A mower 2 having a single blade 8 located in a single cutting chamber 6 has been illustrated in FIG. 1. However, this invention is not limited for use with this type of single-bladed, single-chambered mower, but is also useful on mowers 2 having a plurality of cutting blades 8 contained in one or more cutting chambers 6. Accordingly, this invention has wide application to mulching mowers generally and is not limited for use with respect to the specific mulching mower 2 illustrated in FIG. 1.

A generally circular cutting chamber 6 is provided having a peripheral sidewall 12 and a top wall 14. The bottom face or side of cutting chamber 6 is substantially open and faces the ground when mower 2 is placed upright. Sidewall 12 and top wall 14 are substantially enclosed to prevent the grass clippings from exiting cutting chamber 6 except through the open bottom side of cutting chamber 6, thus causing mower 2 to be a mulching mower. In this regard, the term mulching mower is intended to cover mowers which are convertible between a mulching mode and a grass discharge/collection mode in which the grass clippings can exit cutting chamber 6 through a selectively openable grass discharge outlet in sidewall 12 or top wall 14, as long as such mower has at least one mode or configuration in which sidewall 12 and top wall 14 are substantially enclosed (i.e. the grass discharge outlet is blocked) to cause the clippings to be driven downwardly out of chamber 6 through the open bottom side of the chamber.

Cutting blade 8 is generally rectangular and has identical left and right halves 16. Each cutting blade half 16 has a leading edge 18 and a trailing edge 20 spaced apart by the width of blade 8 taken with respect to the normal forward direction of blade 8 as represented by the arrows A in FIGS. 1 and 2. Cutting blade 8 is secured as will be described in more detail hereafter to a generally vertical shaft of a mower engine or motor (not shown) that rotates cutting blade 8. Cutting blade 8 when rotated travels in a generally horizontal cutting plane.

Leading edge 18 of each blade half 16 has a sharpened cutting edge 24 which extends radially inwardly from the tip 26 of blade 8 for a short distance. Trailing edge 20 of blade 8 includes an upturned flange or sail 28. Sail 28 helps stand the grass up for cutting by cutting edge 24 and creates a generally circumferential airflow in deck 4 in which the grass clippings are entrained. Cutting blade 8 can be integrally formed or stamped out of a single sheet of metallic material in any known manner. Each blade half 16 can include a radial reinforcing rib 21 if desired, and the central portion of blade 8 can include upturned ribs 22 forming a channel-shaped cross-section over at least the central portion of blade 8. While ribs 22 are shown upturned relative to the central portion of blade 8 in that blade 8 illustrated in FIGS. 1–5 herein, such ribs could be dispensed with or could be downturned relative to the central portion of blade 8.

As cutting blade 8 is rotated, cutting edges 24 sever grass at a predetermined height above the ground determined by the height of deck 4 above the ground. This cutting action results in numerous grass clippings which will be circulated in a circumferential direction inside cutting chamber 6 by the airflow created by sails 28. When mower 2 is used as a mulcher, e.g. by closing any grass discharge outlets that might be present in a convertible mower, the grass is confined to circulate within cutting chamber 6 until it is forced downwardly through the open bottom side of cutting chamber 6 and down into the cut grass path.

Mower 2 can be provided with a plurality of fixed grass deflecting members or "kickers" 30 located inside cutting chamber 6 above the plane of blade 8. These deflecting members 30 have grass deflecting surfaces which are designed to intercept the grass clippings being circulated by blade 8 to help deflect them downwardly, as taught by U.S. Pat. Nos. 4,205,512 and 4,951,449 to Thorud, both of which are hereby incorporated by reference. However, this invention can also be applied and is useful in mulching mowers with no such members 30.

Figure 5:
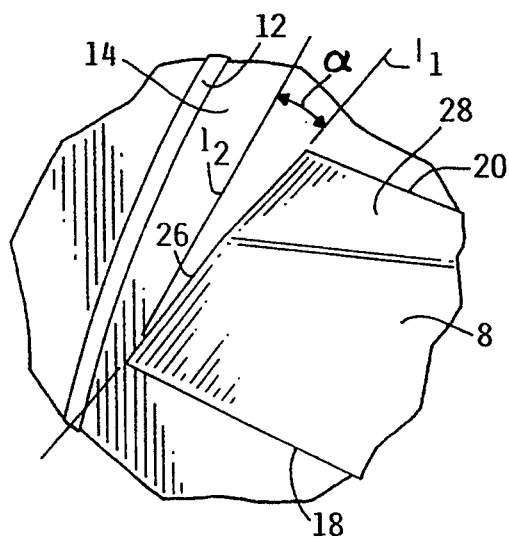
FIG. 5 is an enlarged plan view of a portion of the lawn mower housing and cutting blade shown in FIG. 1, particularly illustrating a cut away or chamfered radial outer tip portion of the cutting blade which forms another aspect of this invention.

Referring now to FIG. 5, in known prior art lawn mowers the radial outer tips 26 of blade 8 are generally either square or cut away or chamfered very slightly (2°−3°) relative to a square configuration of tip 26. In other words, a straight line $l_1$ extending between the radially outermost point of cutting edge 24 and the radially outermost point of sail 28 forms an angle $\alpha$ with a straight line $l_2$ that is arranged perpendicularly to the straight line formed by the leading edge 18 of blade 8. Normally, as noted above, the amount of angular chamfer in prior art lawn mower blades is 2°-3°.

However, applicant has found that by increasing the amount of the blade tip chamfer to the range of about 7°-15°, a considerable power savings can be achieved when blade 8 is used during mulching. Applicant is not precisely certain why this happens. However, it is believed that the grass clippings do not have an opportunity to as readily wedge or jam between the radial tip 26 of blade 8 and sidewall 12. Accordingly, the grass is evacuated more efficiently from cutting chamber 6 without building up or jamming between blade 8 and sidewall 12.

Applicant has found that this change in blade chamfer at the radial tip 26 in and of itself provides improved performance for a mulching mower. In other words, a mulching mower that has a blade 8 which is chamfered at its radial tip 26 by at least about 7°, and preferably in the range of from about 7°-15°, will use substantially less power when mulching in identical grass conditions than that used by a blade in which the radial tip 26 is either square or is chamfered in the more normal amount of 2°-3°. Accordingly, the performance of mower 2 when used as a mulcher is considerably enhanced by using a blade 8 with a blade tip chamfer of the type disclosed herein.

Figure 6:
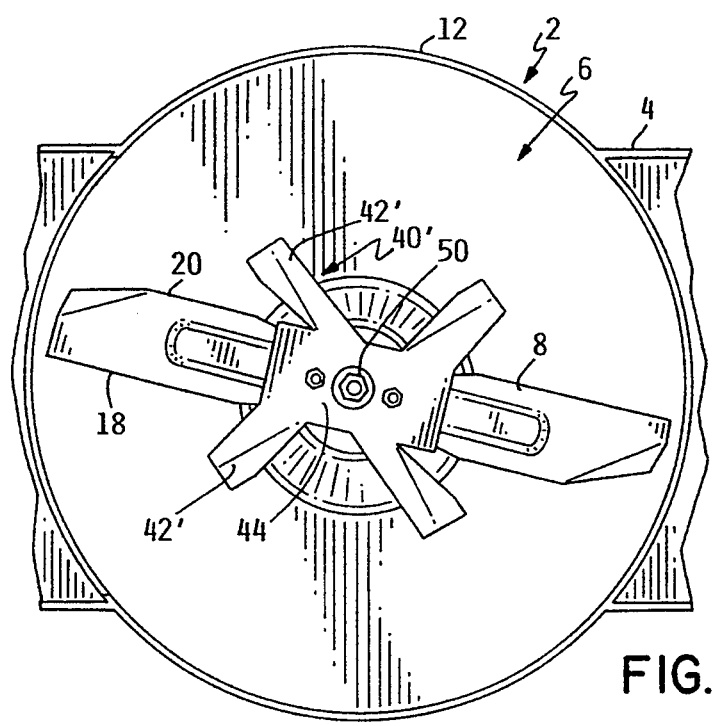
FIG. 6 is a bottom plan view of an improved mulching mower according to this invention, particularly illustrating a second embodiment of a blade winglet attachment according to this invention as applied to a grass cutting blade.
Figure 7:
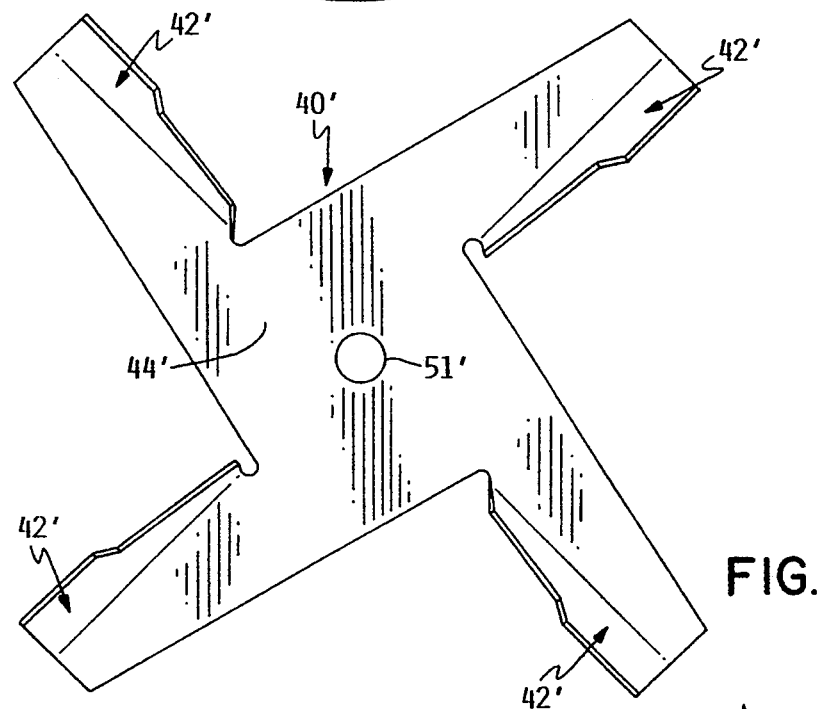
FIG. 7 is a top plan view of the second embodiment of the blade winglet attachment shown in FIG. 6.

In addition the applicant also discovered another way to enhance the mulching effectiveness of mower 2. This additional improvement comprises the addition of a blade winglet attachment 40 to blade 8 to provide a plurality of rotating kicker members which rotate in unison with blade 8 to further help drive the grass clippings downwardly out of cutting chamber 6. A first embodiment of such an attachment is illustrated in FIGS. 1-4 as 40. A second embodiment of such an attachment is illustrated in FIGS. 6 and 7 as 40′.

Referring first to FIGS. 1-4, winglet attachment 40 comprises two grass deflecting members or winglets 42 that are carried on a base plate 44. Each winglet 42 comprises an inclined, planar grass deflecting surface 46. When attachment 40 is mounted to blade 8 as will be described hereafter, each grass deflecting surface 46 is located adjacent one of the blade halves 16 slightly in advance of leading edge 18 of blade half 16. See FIGS. 1 and 2. Each grass deflecting surface 46 is generally parallel to leading edge 18 and is integrally secured to base plate 44. Preferably, attachment 40 is integrally formed out of a piece of metallic material, e.g. steel, with winglets 42 being bent up out of the plane of base plate 44. The inclined, planar grass deflecting surface 46 of winglet 42 extends upwardly from a base 47 secured to base plate 44 to terminate in a free upper edge 48 spaced above the cutting plane of blade 8. Upper edge 48 is located approximately 1.75 inches above winglet base 47.

Base plate 44 comprises a support means for mounting winglets 42 and for positioning them appropriately relative to blade 8. Base plate 44 is secured in an abutting face-to-face relationship to the bottom of blade 8 by the same attachment bolt 50 which normally secures blade 8 to the cutting shaft of the lawn mower engine. Attachment 40 is simply placed beneath blade 8, the shank of bolt 50 then passes upwardly through a hole 51 in base plate 44 and then through the center hole 9 of blade 8. When bolt 50 is tightened, attachment 40 is, in effect, clamped against the bottom of blade 8 to be fixedly secured thereto.

Attachment 40 can function as the usual blade stiffener member that is sometimes added to the bottom of blade 8 to stiffen and support blade 8. In this regard, base plate 44 is formed from a durable metallic material, e.g. steel, and can be provided with upturned side flanges 52 which, in conjunction with winglets 42, create a channel shaped cross-section in which blade 8 can be nested. In other words, blade 8 will fit on top of base plate 44 and the width of base plate 44 is selected so that side flanges 52 are located proximate to either side of blade 8 with the channel-shaped central portion of blade 8 fitting closely inside the channel shaped cross-section of attachment 40. However, the upturned side flanges 52 on base plate 44 can be deleted and base plate 44 can simply be abutted against the bottom of blade 8 if desired.

Each winglet 42 is inclined forwardly relative to the direction of rotation of blade 8. By this it is meant that upper edge 48 of winglet 42 is located forwardly of the base 47 of winglet 42 taken with respect to the forward direction of blade rotation, i.e. upper edge 48 of winglet 42 is in advance of or forward of leading edge 18 of blade 8 so that the front face of surface 46 is downwardly angled relative to grass clippings encountered by that face. The angle of this surface can vary but is preferably about 45° relative to the horizontal. Each winglet 42 is identically shaped.

Figure 2:
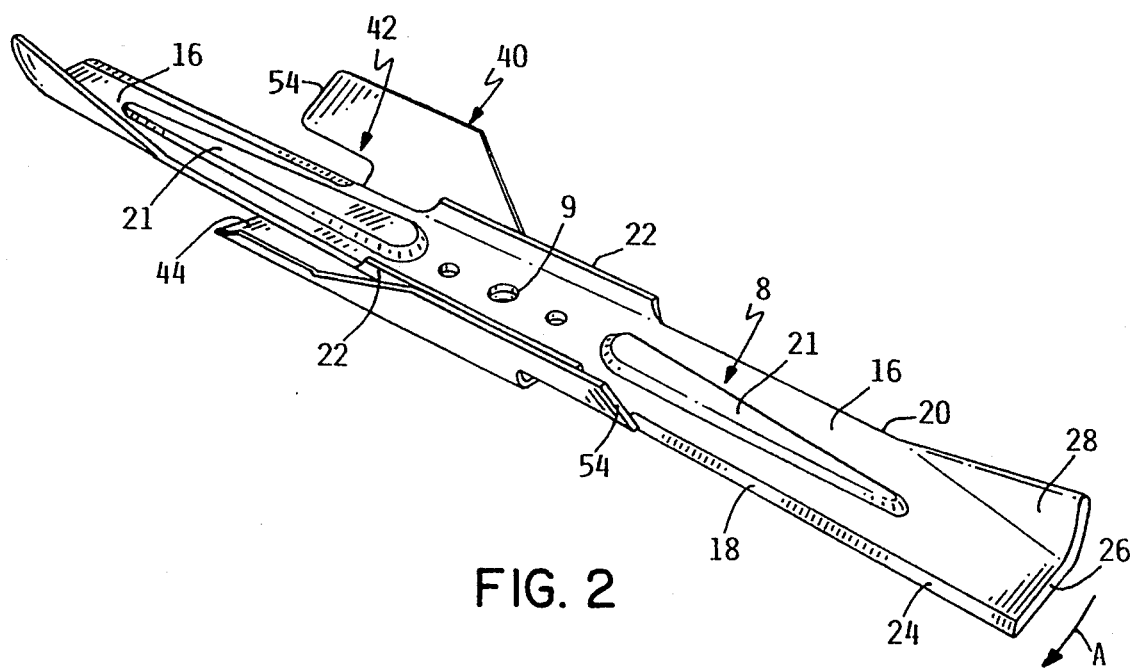
FIG. 2 is a perspective view of the grass cutting blade and blade winglet attachment shown in FIG. 1.
Figure 3:
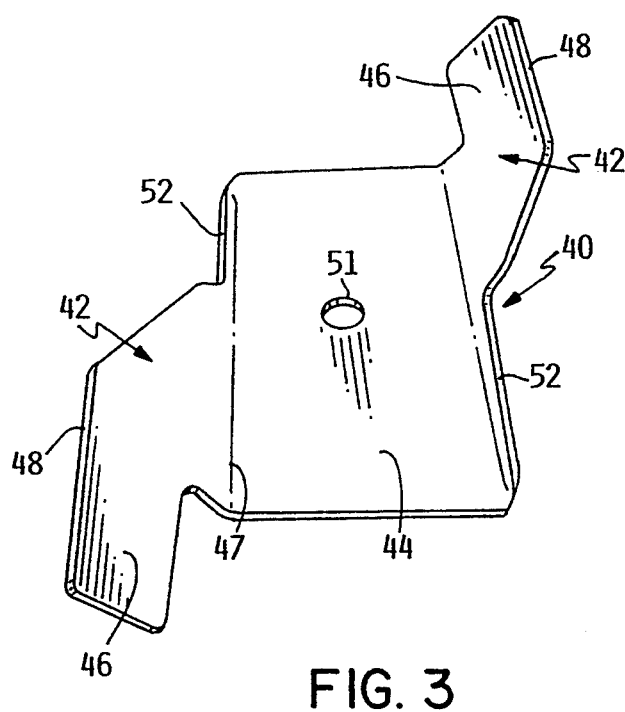
FIG. 3 is a perspective view of the first embodiment of the blade winglet attachment shown in FIG. 1.
Figure 4:
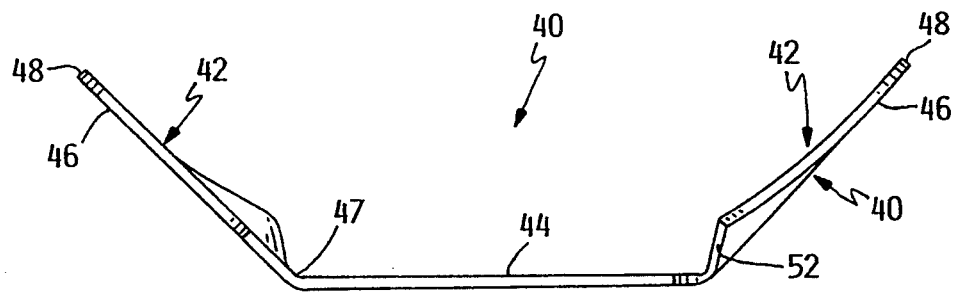
FIG. 4 is an end elevational view of the first embodiment of the blade winglet attachment shown in FIG. 1.

Each winglet 42 extends outwardly from the axis of rotation of mower 2 a fairly short amount. Referring to FIGS. 1 and 2, the outer end 54 of each winglet 42 terminates well inboard of blade tip 26. For example, in a blade having a nominal diameter of 20.895 inches (e.g. a nominal radius of 10.48 inches) as used in a 21 inch lawn mower, the length of winglet 42 is desirably approximately 5 inches extending from the blade axis of rotation 10 to the outer end 54 of winglet 42. Applicant has discovered that the innermost 2 inches of the winglet does relatively less grass deflecting than the outermost 3 inches of the winglet. Thus, it is preferable that the deflecting surface 46 of winglet 42 be long enough to extend over that portion of blade half 16 beginning approximately 2 inches out from the axis of rotation 10 to terminate at an outer end 54 located at between 4 and 6 inches out from the axis of rotation 10. Expressed in terms of the percentage of the blade radius, deflecting surface 46 should be long enough to extend over that portion of blade half 16 beginning at approximately 20% of the blade radius and extending outwardly to terminate at an outer end 54 located at between 40% and 60% of the blade radius.

When attachment 40 including the two winglets 42 are added to blade 8 of this invention, or even to a conventionally shaped blade having a normal tip chamfer when used in the same cutting chamber 6, the applicant found that a further substantial decrease was achieved in the power required to mulch. The power decrease was on the order of approximately 30% when mower 2 was tested in actual field cutting conditions. In other words, when using attachment 40 in actual field cutting conditions, the mower could mulch in identical grass conditions and use approximately 30% less power than when attachment 40 was not secured to the cutting blade.

This is a surprising result and runs counter to what would have been expected. Normally, when adding mass or air moving structure such as fan shaped elements to a blade, one would expect the power requirements for driving that blade to go up. But here, after attachment 40 was added to blade 8, the power requirements for mulching in identical grass conditions went down and they went down substantially.

The applicant believes that the decrease in power achieved by attachment 40 results because winglets 42 form rotating grass deflecting kicker members that serve to more effectively evacuate the grass clippings from cutting chamber 6. Thus, the grass clippings more quickly leave cutting chamber 6 and do not build up as large a halo of circulating grass clippings within deck 4. It is the decrease in the size of the halo that is being circulated by blade 8 which applicant believes leads to the performance improvement achieved by this invention. Applicant further believes that winglets 42 evacuate the grass clippings more quickly by virtue of the mechanical impact of the clippings against grass deflecting surfaces 46 of winglets 42. This mechanical impact serves to drive some of the grass clippings downwardly more quickly than they would otherwise have been driven downwardly.

The attachment 40 is shown in FIGS. 1–4 in a cutting deck 4 in which fixed grass deflecting members 30 are also used. However, the attachment 40 could be used in any type of deck intended for mulching, even one in which no fixed grass deflecting members 30 are present. Applicant further believes that similar performance increases would be observed regardless of the type of deck 4 in which attachment 40 is used.

Figure 8:
FIG. 8 is an end elevational view of the second embodiment of the blade winglet attachment shown in FIG. 6 taken along lines 8—8 in FIG. 7.
Figure 8:
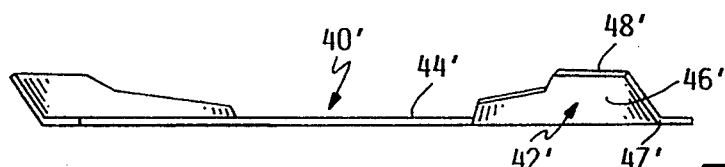

FIGS. 6–8 disclose a second embodiment of winglet attachment, identified as 40', having a different arrangement of winglets 42'. Again, the winglets 42' shown in this version are integrally carried on a base plate 44' that is abutted against the bottom of blade 8 and is secured thereto by attachment bolt 50. Four such winglets 42' are used rather than two and each of the individual winglets 42' is now located at an angle relative to leading edge 18 of blade 8 rather than being parallel thereto. Winglets 42' are generally radial relative to the axis of rotation of the blade. When considering each blade half, there is a winglet 42' both in advance of leading edge 18 of blade 8 and another winglet 42' behind trailing edge 20 of blade 8. See FIG. 6.

However, the winglets 42' in the embodiment of FIGS. 6–8 are generally similar to that in FIGS. 1–4. Each winglet 42' includes a forwardly inclined grass deflecting surface 46' for impacting against the grass clippings being circulated within cutting chamber 6 to more quickly drive these clippings downwardly out of cutting chamber 6 through the open bottom side thereof. Grass deflecting surface 46' includes an upper edge 48' that has a non-uniform height and is integrally secured to base plate 44' along the entire length of base 47' grass deflecting surface 46'. Again, the grass deflecting surfaces 46' on winglet 42' are positioned to be at least 2 inches out from the rotational axis 10, but preferably to terminate inboard of the radial blade tip 26 in the same manner as winglets 42, i.e. to extend radially outwardly but have a length which is less than approximately 6 inches for a blade with a radius of approximately 10.5 inches. Grass deflecting surfaces 46' are somewhat shorter than those described in the first embodiment, having a height of 0.62 inches above winglet base 44', but are inclined at the same 45° angle relative to the horizontal.

One advantage of the blade winglet attachments 40 or 40' of this invention is the ability to easily add the attachments to existing mowers 2 to enhance their mulching effectiveness or effectiveness for a given amount of power. The attachments can simply be abutted against the bottom of the normal blade used in cutting chamber 6 and be secured thereto using the existing attachment bolt 50. This does not disturb the normal elevational position of blade 8 within the housing and does not provide a separate rotating mass on shaft 22 that is substantially vertically spaced above or below blade 8. Moreover, the attachment 40 or 40' can itself reinforce blade 8, and thus can be used in place of the normal blade stiffeners that are sometimes used on some lawn mower blades.

While it is preferred that attachments 40 or 40' of this invention be abutted against the underside of blade 8 as shown herein, due to the blade reinforcement this provides and the lack of any elevational change in blade 8, it would be possible to abut attachments 40 or 40' against the top side of blade 8. In this regard, attachments 40 or 40' would be placed between blade 8 and the bottom of the lawn mower engine shaft or drive means that is used to rotate blade 8. Bolt 50 would still be used to clamp the blade and the attachment against the drive means.

Various modifications of this invention will be apparent to those skilled in the art. Thus, the scope of the invention is to be limited only by the appended claims.

We claim:

1. An improved lawn mower for cutting ground growing vegetation, wherein the lawn mower has at least one cutting blade attached to a rotatable drive means for rotating the blade about a generally vertical rotational axis thereby establishing a generally horizontal cutting plane, wherein the cutting blade includes spaced apart tip portions located on either side of a central portion of the blade, wherein the blade includes a leading edge and a trailing edge taken with reference to a forward direction of rotation of the blade, wherein the leading edge of the blade has a sharpened cutting surface for cutting the vegetation and thereby creating vegetation clippings as the blade rotates in the forward direction of rotation, and further including securing means which engages against a bottom side of the blade to secure the blade to the drive means, wherein the improvement relates to means for enhancing the mulching effectiveness of the blade which comprises:

an attachment for providing a plurality of winglets on the blade which rotate in unison with the blade, wherein the attachment comprises:

(a) support means on which the winglets are carried, wherein the support means is located below the blade with the support means being held in place against the bottom side of the blade when the blade securing means is in place, whereby a normal elevational position of the blade relative to the lawn mower is unchanged; and (b) a plurality of winglets carried on the support means, wherein each winglet has a base portion which is attached to the support means with the winglet extending upwardly from the base portion thereof to terminate in a free upper edge spaced above the cutting plane of the blade, wherein the winglets face forwardly in the direction of rotation of the blade such that the upper edge of the winglet is located forwardly of the base portion of the winglet taken with respect to the forward direction of blade rotation, whereby vegetation clippings encountered by the winglets as the blade rotates in its forward direction of rotation will be deflected downwardly back through the cutting plane of the blade.

2. An improved lawn mower as recited in claim 1, wherein the blade is formed of two halves comprising those portions of the blade extending between each tip portion and the rotational axis of the blade, and wherein at least one winglet is positioned adjacent each blade half.

3. An improved lawn mower as recited in claim 2, wherein each winglet terminates in an outer end, and wherein each winglet extends over less than the full length of each blade half such that the outer end of each winglet is spaced radially inwardly from the tip portion of each blade half.

4. An improved lawn mower as recited in claim 3, wherein each winglet extends over approximately the inner 20–50% of the radius of each blade half.

5. An improved lawn mower as recited in claim 3, wherein each winglet extends over that portion of each blade half beginning at approximately 20% of the blade radius and extending outwardly such that the outer end of the winglet is located at between 40% and 60% of the blade radius.

6. An improved lawn mower as recited in claim 4, wherein the central portion of the blade is rectangularly shaped, and wherein the support means has a channel-shaped cross-sectional configuration which is configured to allow the rectangular shape of the central portion of the blade to be nested inside the channel-shaped cross-sectional configuration of the support means in a relatively close fit.

7. An improved lawn mower as recited in claim 2, wherein each winglet comprises a planar grass deflecting surface which is substantially parallel to the leading edge of the blade half.

8. An improved lawn mower as recited in claim 2, wherein each winglet comprises a planar grass deflecting surface which is angled relative to the leading edge of the blade half.

9. An improved lawn mower as recited in claim 8, wherein one winglet is located in advance of the leading edge of each blade half and one winglet is located behind the trailing edge of each blade half.

10. An improved lawn mower as recited in claim 2, wherein each winglet is inclined at approximately 45° relative to the horizontal.

11. An improved lawn mower as recited in claim 2, further including grass deflecting means fixed inside the cutting chamber above the plane of rotation of the blade and above radially outer portions of the blade, the grass deflecting means comprising at least one kicker member having a grass deflecting surface located to intercept the grass clippings being circulated inside the cutting chamber.

12. An improved lawn mower as recited in claim 1, wherein the support means is configured to abut against the bottom side of the blade over at least a portion of the central portion of the blade in a mating face-to-face relationship so as to reinforce the blade.

13. An improved lawn mower as recited in claim 1, wherein the tip portions of the blade terminate adjacent a peripheral sidewall on the lawn mower which sidewall encloses the rotational path of the blade to help form a portion of a cutting chamber in which the blade is contained, and wherein the tip portions are cut back between the leading and trailing edges thereof by a chamfer in the range of about 7°–15° relative to a square radial tip configuration.

14. An improved lawn mower for cutting ground growing vegetation, wherein the lawn mower has at least one cutting blade attached to a rotatable drive means for rotating the blade about a generally vertical rotational axis thereby establishing a generally horizontal cutting plane, wherein the cutting blade includes spaced apart tip portions located on either side of a central portion of the blade, wherein the blade includes a leading edge and a trailing edge taken with reference to a forward direction of rotation of the blade, wherein the leading edge of the blade has a sharpened cutting surface for cutting the vegetation and thereby creating vegetation clippings as the blade rotates in the forward direction of rotation, and further including means for securing the blade to the drive means, wherein the improvement relates to means for enhancing the mulching effectiveness of the blade which comprises:

an attachment for providing a plurality of winglets on the blade which rotate in unison with the blade, wherein the attachment comprises:

(a) support means on which the winglets are carried, wherein the support means is abutted against the blade such that the support means and the blade are clamped together when the blade securing means is used to secure the blade to the drive means;

(b) a plurality of winglets carried on the support means, wherein each winglet has a base portion with the winglet extending upwardly from the base portion thereof to terminate in a free upper edge spaced above the cutting plane of the blade, and wherein each winglet is inclined forwardly with respect to the forward direction of rotation of the blade such that the upper edge of the winglet forms a leading edge of the winglet and the base portion of the winglet forms a trailing edge of the winglet taken with reference to the forward direction of rotation of the blade; and (c) wherein the blade is formed of two halves comprising those portions of the blade extending between each tip portion and the rotational axis of the blade, and wherein at least one winglet is provided for each blade half, and wherein each winglet extends over that portion of each blade half beginning at approximately 20% of the blade radius and continuing outwardly to at least approximately 40% of the blade radius.

15. An improved lawn mower as recited in claim 14, wherein an outer end of each winglet is located at between 40% and 60% of the blade radius.

16. An improved lawn mower as recited in claim 14, wherein the blade securing means engages against a bottom side of the blade to secure the blade to the drive means, and wherein the support means for the winglets is located below the blade between the blade and the blade securing means such that the support means is held in place against the bottom side of the blade when the blade securing means is in place.

17. An improved lawn mower as recited in claim 14, wherein each winglet comprises a substantially planar grass deflecting surface which is substantially parallel to the leading edge of the blade.

18. An improved lawn mower as recited in claim 14, wherein each winglet comprises a substantially planar grass deflecting surface which is angularly offset relative to the leading edge of the blade.

19. An improved lawn mower for cutting ground growing vegetation, wherein the lawn mower has at least one cutting blade attached to a rotatable drive means for rotating the blade about a generally vertical rotational axis, wherein the cutting blade is contained in a mulching mode inside a generally enclosed cutting chamber having a peripheral sidewall and a substantially open bottom side, wherein the cutting blade includes spaced apart tip portions located on either side of a central portion of the blade, wherein the blade includes a leading edge and a trailing edge taken with reference to a forward direction of rotation of the blade, wherein the leading edge of the blade has a sharpened cutting surface for cutting the vegetation and thereby creating vegetation clippings as the blade rotates in the forward direction of rotation, and further including means for securing the blade to the drive means, wherein the improvement relates to means for enhancing the mower's mulching effectiveness, which comprises:
   (a) grass deflecting means fixed inside the cutting chamber above a plane of rotation of the blade and above radially outer portions of the blade, the grass deflecting means having a grass deflecting surface located to intercept the grass clippings being circulated inside the cutting chamber; and
   (b) a plurality of winglets that rotate in unison with the blade with the winglets acting as rotating kickers for further deflecting the vegetation clippings downwardly, wherein the winglets are inclined forwardly in the direction of rotation of the blade such that an upper edge of the winglet is located forwardly of a lower edge of the winglet taken with respect to the forward direction of blade rotation.

20. An improved lawn mower as recited in claim 19, wherein the blade is formed of two halves comprising those portions of the blade extending between each tip portion and the rotational axis of the blade, and wherein at least one winglet is positioned adjacent each blade half.

21. An improved lawn mower as recited in claim 20, wherein each winglet is long enough to extend over that portion of each blade half beginning at approximately 20% of the blade radius and extending outwardly such that an outer end of the winglet is located at between 40% and 60% of the blade radius.

22. An improved lawn mower as recited in claim 19, wherein the tip portions of the blade terminate adjacent the peripheral sidewall, and wherein the tip portions are cut back between the leading and trailing edges thereof by a chamfer in the range of about 7°–15° relative to a square radial tip configuration.

23. An improved lawn mower as recited in claim 19, wherein the grass deflecting means comprises at least one kicker member.

24. An improved lawn mower as recited in claim 23, wherein the grass deflecting means comprises a plurality of kicker members circumferentially spaced around the cutting chamber.

25. An improved lawn mower as recited in claim 19, wherein the winglet has a vertically highest edge in relation to the cutting plane of the blade with this vertically highest edge being located above the cutting plane of the blade, and wherein this vertically highest edge comprises the upper edge of the winglet.

26. An improved lawn mower as recited in claim 19, wherein the cutting chamber includes a selectively openable and closable grass discharge outlet, and further including selectively operable means for blocking the grass discharge outlet to place the mower in its mulching mode.

27. An improved lawn mower as recited in claim 19, wherein the cutting chamber is defined by a continuous sidewall and adjoining top wall which are substantially solid and which have no grass discharge outlet such that the mower has only a mulching mode in which the only exit for the clippings is through the open bottom side of the cutting chamber.

28. An improved lawn mower for cutting ground growing vegetation, wherein the lawn mower has at least one cutting blade attached to a rotatable drive means for rotating the blade in a generally horizontal cutting plane about a generally vertical rotational axis, wherein the cutting blade is contained in a mulching mode inside a generally enclosed cutting chamber having a peripheral sidewall and a substantially open bottom side, wherein the cutting blade includes spaced apart tip portions located on either side of a central portion of the blade, wherein each tip portion includes a leading edge and a trailing edge taken with reference to a forward direction of rotation of the blade, wherein the leading edge of the blade has a sharpened cutting surface for cutting the vegetation and thereby creating vegetation clippings as the blade rotates in the forward direction of rotation, wherein the improvement relates to means for enhancing the mower's mulching effectiveness, which comprises:
   tip portions of the blade which terminate adjacent the peripheral sidewall, and wherein the tip portions are cut back between the leading and trailing edges thereof by a chamfer in the range of about 7°–15° relative to a square radial tip configuration.

29. An improved lawn mower as recited in claim 28, further including grass deflecting means fixed inside the cutting chamber above the plane of rotation of the blade and above radially outer portions of the blade, the grass deflecting means comprising at least one kicker member having a grass deflecting surface located to intercept the grass clippings being circulated inside the cutting chamber.

30. An improved lawn mower as recited in claim 28, wherein the cutting chamber includes a selectively openable and closable grass discharge outlet, and further including selectively operable means for blocking the grass discharge outlet to place the mower in its mulching mode.

31. An improved lawn mower as recited in claim 28, wherein the cutting chamber is defined by a continuous sidewall and adjoining top wall which are substantially solid and which have no grass discharge outlet such that the mower has only a mulching mode in which the only exit for the clippings is through the open bottom side of the cutting chamber.

32. An improved lawn mower for cutting ground growing vegetation, wherein the lawn mower has at least one cutting blade attached to a rotatable drive means for rotating the blade about a generally vertical rotational axis thereby establishing a generally horizontal cutting plane, wherein the cutting blade includes spaced apart tip portions located on either side of a central portion of the blade, wherein the blade includes a leading edge and a trailing edge taken with reference to a forward direction of rotation of the blade, wherein the leading edge of the blade has a sharpened cutting surface for cutting the vegetation and thereby creating vegetation clippings as the blade rotates in the forward direction of rotation, and further including securing means which engages against a bottom side of the blade to secure the blade to the drive means, wherein the improvement relates to means for enhancing the mulching effectiveness of the blade which comprises:

an attachment for providing a plurality of winglets on the blade which rotate in unison with the blade, wherein the attachment comprises:
(a) support means on which the winglets are carried, wherein the support means is located below the blade with the support means being held in place against the bottom side of the blade when the blade securing means is in place, whereby a normal elevational position of the blade relative to the lawn mower is unchanged;
(b) a plurality of winglets carried on the support means, wherein each winglet has a base portion which is attached to the support means with the winglet extending upwardly from the base portion thereof to terminate in a free upper edge spaced above the cutting plane of the blade;
(c) wherein the tip portions of the blade terminate adjacent a peripheral sidewall on the lawn mower which sidewall encloses the rotational path of the blade to help form a portion of a cutting chamber in which the blade is contained, and wherein the tip portions are cut back between the leading and trailing edges thereof by a chamfer in the range of about 7°–15° relative to a square radial tip configuration.

33. An improved lawn mower for cutting ground growing vegetation, wherein the lawn mower has at least one cutting blade attached to a rotatable drive means for rotating the blade about a generally vertical rotational axis thereby establishing a generally horizontal cutting plane, wherein the cutting blade includes spaced apart tip portions located on either side of a central portion of the blade, wherein the blade includes a leading edge and a trailing edge taken with reference to a forward direction of rotation of the blade, wherein the leading edge of the blade has a sharpened cutting surface for cutting the vegetation and thereby creating vegetation clippings as the blade rotates in the forward direction of rotation, and further including securing means which engages against a bottom side of the blade to secure the blade to the drive means, wherein the improvement relates to means for enhancing the mulching effectiveness of the blade which comprises:

an attachment for providing a plurality of winglets on the blade which rotate in unison with the blade, wherein the attachment comprises:
(a) support means on which the winglets are carried, wherein the support means is located below the blade with the support means being held in place against the bottom side of the blade when the blade securing means is in place, whereby a normal elevational position of the blade relative to the lawn mower is unchanged;
(b) a plurality of winglets carried on the support means, wherein each winglet has a base portion which is attached to the support means with the winglet extending upwardly from the base portion thereof to terminate in a free upper edge spaced above the cutting plane of the blade; and
(c) wherein the blade is formed of two halves comprising those portions of the blade extending between each tip portion and the rotational axis of the blade, wherein at least one winglet is positioned adjacent each blade half, and wherein each winglet comprises a planar grass deflecting surface which is substantially parallel to the leading edge of the blade half.

34. An improved lawn mower for cutting ground growing vegetation, wherein the lawn mower has at least one cutting blade attached to a rotatable drive means for rotating the blade about a generally vertical rotational axis, wherein the cutting blade is contained inside a generally enclosed cutting chamber having a peripheral sidewall and a substantially open bottom side in a mulching mode thereof, wherein the cutting blade includes spaced apart tip portions located on either side of a central portion of the blade, wherein the blade includes a leading edge and a trailing edge taken with reference to a forward direction of rotation of the blade, wherein the leading edge has a sharpened cutting surface for cutting the vegetation and thereby creating vegetation clippings as the blade rotates in the forward direction of rotation, and further including means for securing the blade to the drive means, wherein the improvement relates to means for enhancing the mower's mulching effectiveness, which comprises:
(a) at least two airflow inducing sails which are swept up and inclined rearwardly with respect to a forward direction of rotation of the blade, wherein one said is located at each tip portion of the blade to create a generally circular flow of clippings within the cutting chamber located above the blade;
(b) at least two winglets which rotate in unison with radially inner portions of the blade with the winglets located radially inboard of the sails, wherein the winglets extend upwardly from the plane in which the radially inner portions of the blade rotate and are inclined forwardly with respect to a forward direction of rotation of the blade with a substantial portion of each winglet being located above the plane in which the radially inner portions of the blade rotate; and
(c) wherein the cutting chamber is sufficiently open above the blade such that both the sails and the winglets are exposed to the grass clippings which are circulating in the cutting chamber under the influence of the airflow created by the sails.

35. An improved lawn mower as recited in claim 34, wherein the winglets are carried on an attachment that is secured to one side of the blade to detachably secure the winglets to the blade.

36. An improved lawn mower as recited in claim 35, wherein the attachment is clamped against a bottom side of the blade.

37. An improved lawn mower as recited in claim 34, wherein the cutting chamber includes a selectively openable and closable grass discharge outlet, and further including selectively operable means for blocking the grass discharge outlet to place the mower in its mulching mode.

38. An improved lawn mower as recited in claim 34, wherein the cutting chamber is defined by a continuous sidewall and adjoining top wall which are substantially solid and which have no grass discharge outlet such that the mower has only a mulching mode in which the only exit for the clippings is through the open bottom side of the cutting chamber.

39. An improved lawn mower as recited in claim 34, and further including deflecting means fixed inside the cutting chamber above the cutting plane of the blade and above the tip portions of the blade, the deflecting means having a deflecting surface located to intercept the clippings being circulated inside the cutting chamber and to deflect such clippings downwardly.

* * * * *

UNITED STATES PATENT AND TRADEMARK OFFICE
CERTIFICATE OF CORRECTION

PATENT NO. : 5,363,635

DATED : November 15, 1994

INVENTOR(S) : Donald M. White, III et al.

It is certified that error appears in the above-indentified patent and that said Letters Patent is hereby corrected as shown below:

Column 14, line 37, claim 34, "said" should read --said--.

Signed and Sealed this

Seventh Day of February, 1995

Attest:

BRUCE LEHMAN

Attesting Officer

Commissioner of Patents and Trademarks